April 18, 1950     P. F. BECHBERGER     2,504,489
FREQUENCY AND VOLTAGE REGULATOR Filed June 25, 1948

INVENTOR.
PAUL F. BECHBERGER
BY
*Herbert L. Davis Jr.*
- ATTORNEY -

Patented Apr. 18, 1950

2,504,489

UNITED STATES PATENT OFFICE 2,504,489

FREQUENCY AND VOLTAGE REGULATOR

Paul F. Bechberger, Tenafly, N. J., assignor to Bendix Aviation Corporation, Teterboro, N. J., a corporation of Delaware Application June 25, 1948, Serial No. 35,131

8 Claims. (Cl. 322—24)

The present invention relates to electric regulation of alternating current circuits and more particularly to novel electronic means for regulating the voltage output and frequency or speed of an electric motor driven generator.

An object of the invention is to provide novel electronic valve means through which the output of an A. C. generator may be connected so as to affect the control coils of conventional type regulators to maintain a predetermined voltage and frequency output.

Another object of the invention is to provide a controlled rectifier, including a multi-element electronic valve, through the plate circuit of which the control coil of a carbon pile regulator may be supplied with an operating voltage to maintain the regulated voltage; and in which there is provided a rheostat for adjusting the cathode drop, thus permitting control and setting of the regulator by a relatively low resistance rheostat.

Another object of the invention is the provision of a multi-element electronic valve and control circuit for regulating the frequency or speed of the motor of a motor generator set and in which the grid and plate voltages of the electronic valve are in phase below approximate resonant frequency of the circuit and approximately 180° out of phase above resonant frequency of the circuit so as to give a sharp cut off of plate current with respect to frequency.

Another object of the invention is to so arrange the aforenoted circuit that the plate circuit can be fed to the control coil of a variable resistance regulator, which in turn controls the motor field current for speed control. The latter arrangement thus gives low control coil current at low frequencies due to low generator output voltages at low speeds so as to effect a high field current condition desirable for starting.

The above and other objects and features of the invention will appear more fully hereinafter from a consideration of the following description taken in connection with the accompanying drawing wherein one embodiment of the invention is illustrated by way of example.

Figure 1:
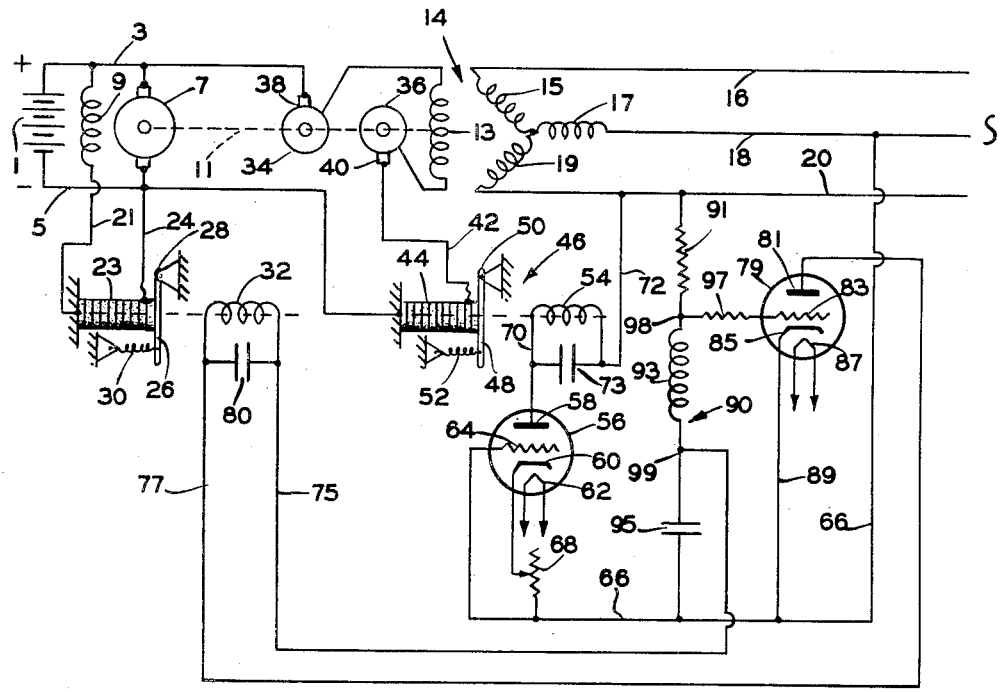
Figure 1 is a diagrammatic showing of a system embodying the invention.

In the arrangement shown in Figure 1 of the drawing there is provided a source of direct current such as a battery 1 connected through conductors 3 and 5 to the armature of a D. C. motor indicated generally by the numeral 7 and having a shunt field winding 9 of conventional type. The motor 7 drives through a shaft 11 an exciting winding 13 of an alternator indicated generally by the numeral 14. The alternator 14 has 3-phase stator windings 15, 17 and 19 with suitable output lines 16, 18 and 20, respectively.

The shunt field winding 9 of the motor 7 is connected at one end to the conductor 3 while the opposite end of the field winding 9 is connected by a conductor 21 to an end of a variable resistance element or carbon pile 23. The opposite end of the variable resistance element 23 is connected by a conductor 24 to the line 5.

The carbon pile regulator may be of a type disclosed and claimed in U. S. Patent No. 2,427,805 of William G. Neild, dated September 23, 1947, and assigned to Bendix Aviation Corporation.

The regulator is shown diagrammatically as including an armature 26 pivoted at 28 and biased under tension of a spring 30 in a direction tending to decrease the resistance of the pile 23 so as to increase the energization of the shunt field 9 and thereby effect a decrease in the speed of the motor 7.

An electromagnetic winding or coil 32 biases the armature 26 in a direction opposing the spring 30 and tending to increase the resistance of the carbon pile 23 so as to decrease the energization of the shunt field 9 and thereby increase the speed of the motor 7.

The control winding 32 is connected across the output of the alternator 14 through a rectifier and frequency responsive control circuit as will be explained in greater detail hereinafter.

The exciting winding 13 of the alternator 14 is connected to slip rings 34 and 36. The ring 34 is connected by a suitable brush 38 to the conductor 3, while the ring 36 is connected by a suitable brush 40 and conductor 42 to one end of a variable resistance element or carbon pile 44 of a voltage regulator indicated generally by the numeral 46.

The opposite end of the carbon pile 44 is connected to conductor 5 leading to the source of electrical energy 1. Thus, the source of electrical energy 1 is connected through variable resistance 44 to the exciting winding 13 of the alternator 14. The carbon pile regulator 46 may be of a type disclosed and claimed in U. S. Patent No. 2,427,805 of William G. Neild, dated September 23, 1947, and assigned to Bendix Aviation Corporation.

The voltage regulator 46 is shown diagrammatically as including an armature 48 pivoted at 50 and biased under tension of a spring 52 in a direction tending to decrease the resistance of the pile 44 and increase the energization of the exciting winding 13 so as to effect an increase in the voltage output of the alternator 14. An electromagnetic winding or coil 54 biases the armature 48 in a direction opposing the spring 52 and tending to increase the resistance of the carbon pile 44 so as to decrease the energization of the exciting winding 13 and thereby decrease the output voltage of the alternator 14.

The control coil 54 is connected to the output lines 18 and 20 of the alternator 14 through a novel rectifier and voltage regulator circuit as will be described.

Voltage regulator circuit

The voltage regulator circuit for controlling the winding 54 includes a multi-element electronic valve 56 having a plate or anode element 58, a cathode element 60, a heater element 62 and a control grid element 64. The grid element 64 is connected through a conductor 66 to the output line 18 of the alternator 14, while the cathode element 60 is connected through an adjustable resistance 68 to the conductor 66. The plate element 58 is connected through a conductor 70, control winding 54 and a conductor 72 to an output line 20 of the alternator 14. A capacitor 73 is connected across the winding 54 to smooth out the current pulsations in the control winding 54.

The electronic valve 56 thus provides a controlled rectifier for supplying current to the control coil 54 of the carbon pile regulator 46 which in turn regulates the output voltage of the alternator 14 by controlling the current to the generator field winding 13. Through the arrangement of the variable resistor 68, the operating voltage may be readily adjusted by operation of the variable resistor 68 by varying the voltage drop between cathode element 60 and grid 64. Thus, adjustment of the cathode drop allows control by a relatively low resistance element 68 and selection of the desired voltage to be maintained.

The electromagnetic winding 54 biases the armature 48 in a direction opposing the spring 52 and tending to increase the resistance of the carbon pile 44 so as to decrease the energization of the exciting winding 13 and thereby decrease the output voltage of the alternator 14. Thus, the regulator 46 tends to regulate the output voltage of the alternator 14.

From the foregoing it will be seen that upon a change in the load across the output lines of the alternator 14 the output voltage of the alternator 14 will tend to change together with the speed of motor 7 bringing into operation the novel frequency regulator circuit.

Frequency regulator circuit

The frequency regulator control coil 32 is connected by conductors 75 and 77 to the output of a multi-element electronic valve 79. A capacitor 80 is connected across the winding 32 to smooth out the current pulsations in the control winding 32.

The multi-element electronic valve 79 includes a plate or anode element 81, control grid element 83, cathode element 85 and a heater element 87. The plate element 81 is connected through the conductor 77 to the control winding 32, while the cathode element 85 is connected by conductor 89 to the line 66 leading from the output line 18 of the alternator 14.

Also connected across the output lines 18 and 20 of the alternator 14 is a tuned circuit 90 including resistor element 91, inductance element 93 and a capacitor element 95 which elements are connected in series as shown in the drawing of Figure 1. The grid 83 is connected through a grid current limiting resistor 97 to a point 98 between the resistor 91 and the inductance 93. The conductor 75 leading from the frequency control winding 32 is connected at a point 99 at an opposite side of the inductance 93 and between the inductance and the capacitor 95.

Figure 2:
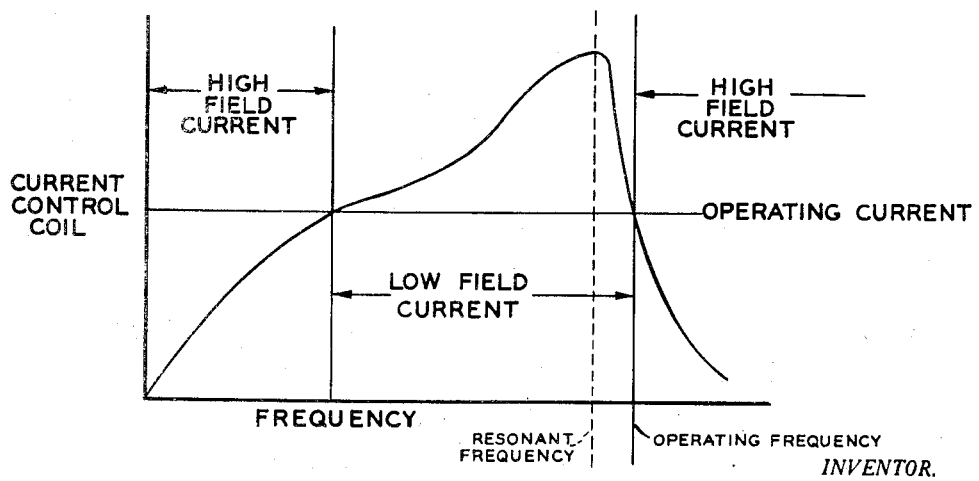
Figure 2 is a drawing graphically illustrating the mode of operation of the invention.

The capacitor 95 and inductance 93 are so selected and the arrangement is such that the grid and plate voltages are in phase below resonance of the tuned circuit and approximately 180° out of phase above resonance of the tuned circuit so as to give a sharp cut off of plate current with respect to a frequency in excess of resonance as indicated in Figure 2. This plate current is fed to the control coil 32 through conductors 75 and 77 so as to in turn control the current of the motor field winding 9 for speed regulation.

In the latter arrangement, the value of the capacitor 95 relative to the inductance 93 is such that when the output frequency of the alternator 14 is below resonance, the voltage across the capacitor 95 is greater than the voltage across the inductance 93 which is 180° out of phase with the capacitor voltage so that the resultant voltage applied to the grid 83 from across the series connected capacitor 95 and inductance 93 is in phase with the voltage appearing across the capacitor 95 and thus at speeds below resonance the voltage applied to the grid 83 is in phase with the voltage applied to the plate 81 from across the capacitor 95 through conductor 75.

However, at speeds greater than the resonant frequency the voltage appearing across the inductance 93 is greater than the voltage appearing across the capacitor 95. Moreover, since the voltage across the inductance 93 is approximately 180° out of phase with the voltage across the capacitor 95 the resultant voltage applied to the grid 83 from across the series connected capacitor 95 and inductance 93 is, in effect, 180° out of phase with the plate voltage. The voltage applied to the plate 81 reflects the voltage across the capacitor 95 which is connected to the plate 81 through conductor 75, frequency control winding 32 and conductor 77.

It will be seen then that when the output frequency of the alternator 14 exceeds resonant frequency a sharp cut off in the current supplied the frequency control winding 32 is effected due to the out of phase relationship between the voltages applied to the grid 83 and to the plate 81, as indicated graphically in Figure 2.

The desired operating frequency or speed of the motor 7 is somewhat greater than the resonant frequency and the regulator operates along the sharp cut off slope of the curve of Figure 2 so that slight change in frequency will effect a large change in the control current of the winding 32.

It will be seen then that during normal operation, current in the frequency control coil 32 decreases sharply upon an increase in output frequency of the alternator 14 over the desired speed, while a sharp increase in the current of the control coil 32 is effected upon a decrease in the output of the alternator 14 below the desired speed so as to tend to maintain the frequency of the regulator at a predetermined operating frequency, which operating frequency is greater than that of the resonant frequency of the tuned circuit including the resistor 81, inductance 93 and capacitor 95.

Further, as shown graphically in Figure 2, the novel frequency responsive tuned circuit 90 gives low control coil current at low frequencies due to low generator output voltages at low speeds, which means a high current for the motor field winding 9 which is desirable for starting.

Thus, the aforenoted arrangement effects a quick and desired starting characteristic of the motor 7 by providing high energizing currents for the shunt field winding 9 of the motor 7 at low operating speeds and until the speed of the motor 7 approaches near the desired operating speed.

Although only one embodiment of the invention has been illustrated and described, various changes in the form and relative arrangements of the parts may be made to suit requirements.

What is claimed is:

1. For use with a variable speed generator having a pulsating output current, the frequency of which varies with the speed of the generator, the combination comprising an electronic valve means having an anode, a cathode and a control grid, a tuned circuit having a predetermined resonant frequency for controlling the operation of said electronic valve means, said tuned circuit including capacitor means and inductance means connected in series and adapted to be connected across the output of said generator, means connecting said cathode and control grid across said tuned circuit, and means connecting said anode and cathode across said capacitor means, said capacitor means being of such a value relative to said inductance means that upon said output current being applied to said tuned circuit at a frequency in excess of the predetermined resonant frequency of said circuit there will be applied a voltage across said grid and cathode which will be out of phase with a voltage applied across said cathode and anode so as to effect a sharp cut off of electronic flow from the cathode to anode.

2. The combination defined by claim 1 in which the means connecting said anode and cathode across said capacitor includes a winding for regulating the generator to an output frequency somewhat greater than the resonant frequency of said tuned circuit.

3. In a speed control system for maintaining the speed of a dynamo-electric generator at a predetermined value, said generator having an alternating current output which varies in frequency with the speed of the generator, comprising a circuit tuned to a frequency slightly below that of a predetermined frequency which it is desired to maintain, said tuned circuit including a capacitor and an inductance connected in series, said tuned circuit adapted to be connected across the output of said generator, an electron discharge device including a cathode, an anode and a control grid, means connecting said cathode and control grid across said tuned circuit, and means connecting said cathode and anode across said capacitor, said last mentioned means including a winding responsive to electron flow from the cathode to said anode for regulating the speed of said dynamo-electric generator to said predetermined frequency.

4. For use in regulating voltage and frequency of an output current from a dynamo-electric generator; the combination comprising a circuit tuned to a frequency slightly below that of a predetermined frequency which it is desired to maintain, said tuned circuit including a capacitor and an inductance connected in series, said tuned circuit adapted to be connected across the output of said generator, an electron discharge device including a cathode, an anode and a control grid, means connecting said cathode and control grid across said tuned circuit, and means connecting said cathode and anode across said capacitor, said last mentioned means including a winding responsive to electron flow from the cathode to said anode for regulating the speed of said dynamo-electric generator to said predetermined frequency, another electron discharge device including a cathode, an anode and a control grid, first conducting means adapted to connect said anode and cathode across the output of said generator, a resistor connected between said cathode and grid for controlling the voltage drop between said cathode and grid, said conducting means including a winding for regulating the output of said dynamo-electric generator to a predetermined voltage, and said resistor including operable means for selectively changing said predetermined output voltage.

5. In a speed control system for maintaining the speed of a dynamo-electric generator at a predetermined value, said generator having a pulsating output current the frequency of which varies with the speed of the generator, the combination comprising an electronic valve means including an anode, a cathode and a control grid, a tuned circuit connected across the output of said generator and having a predetermined resonant frequency slightly below that of the predetermined speed value which it is desired to maintain, means connecting said cathode and grid across said tuned circuit, said anode connected in said tuned circuit in such a manner that upon said output current being applied to said tuned circuit at a frequency in excess of the resonant frequency of said circuit there will be applied to said control grid a voltage which will be out of phase with the voltage across said anode and cathode to effect a sharp change in the electron flow from the cathode to the anode upon change in the speed of said generator from said predetermined value, and said means connecting the anode in said tuned circuit including a winding to regulate the speed of said generator in response to electron flow from said cathode to said anode so as to maintain the speed of the generator at said predetermined value.

6. In a speed control system for maintaining the speed of a dynamo-electric generator at a predetermined value, said generator having a pulsating output current the frequency of which varies with the speed of the generator, the combination comprising an electronic valve means including an anode, a cathode and a control grid, a tuned circuit connected across the output of said generator and having a predetermined resonant frequency slightly below that of the predetermined speed value which it is desired to maintain, means connecting said anode, cathode and control grid to said tuned circuit so that upon said output current being applied to said tuned circuit at a frequency in excess of the resonant frequency of said tuned circuit there will be applied to said control grid a voltage which will be out of phase with the voltage across said anode and cathode to effect a sharp change in the electron flow from the cathode to the anode upon change in the speed of said generator from said predetermined value, and a winding to regulate the speed of said generator in response to electron flow from said cathode to said anode so as to maintain the speed of the generator at said predetermined value.

7. A control system comprising a direct current motor, an alternating current generator driven by said motor, a carbon pile resistor in the field circuit of said motor, a resiliently biased armature for said resistor for maintaining the ohmic value of said pile at a minimum, electromagnetic means for increasing the ohmic value of the resistor upon energization thereof, an electronic valve for controlling the energization of said electromagnetic means, a frequency sensitive circuit for said generator to provide a signal voltage responsive to the frequency of the generated voltage, said circuit including capacitor means and inductance means connected in series and across the output of said generator, said circuit having a predetermined resonant frequency and being electrically connected to said valve to control the electronic flow therethrough, said capacitor means being of such a value relative to said inductance means that upon the output generated voltage being applied to said circuit at a frequency in excess of the predetermined resonant frequency of said circuit there will be applied to said valve a signal voltage to sharply effect the electronic flow through said valve, said electromagnetic means being connected in the output of said electronic valve and responsive to such changes in the electronic flow through said valve to regulate the motor speed to a predetermined value greater than said predetermined resonant frequency.

8. The combination defined by claim 7 including a second carbon pile resistor in the field circuit of said generator for regulating the generated output voltage, a resiliently biased armature for said second resistor for maintaining the ohmic value of said second pile at a minimum, electromagnetic means for increasing the ohmic value of the second resistor upon energization thereof, an electronic valve for controlling the energization of said last mentioned electromagnetic means, said electronic valve including a cathode, an anode and a control grid, means including said last mentioned electromagnetic means connecting said anode and cathode across the output of said generator, a resistor connected between said cathode and grid for controlling the voltage drop between said cathode and grid, said electromagnetic means for regulating the output of said generator to a predetermined voltage, and said resistor including operator-operative means to select said output voltage.

PAUL F. BECHBERGER.

REFERENCES CITED

The following references are of record in the file of this patent:

UNITED STATES PATENTS

| Number | Name | Date |
|---|---|---|
| 1,917,473 | Von Ohlsen | July 11, 1933 |
| 2,035,613 | Miller | Mar. 31, 1936 |